US012099316B2

(12) United States Patent
Okuno

(10) Patent No.: US 12,099,316 B2
(45) Date of Patent: Sep. 24, 2024

(54) DEVELOPING DEVICE AND IMAGE FORMING APPARATUS THAT SUPPRESS DISCHARGE OF DEVELOPER

(71) Applicant: FUJIFILM Business Innovation Corp., Tokyo (JP)

(72) Inventor: Taichiro Okuno, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/887,503

(22) Filed: Aug. 14, 2022

(65) Prior Publication Data

US 2023/0305438 A1 Sep. 28, 2023

(30) Foreign Application Priority Data

Mar. 24, 2022 (JP) ................................ 2022-048556

(51) Int. Cl.
*G03G 15/08* (2006.01)
*G03G 21/20* (2006.01)

(52) U.S. Cl.
CPC ..... *G03G 15/0889* (2013.01); *G03G 15/0882* (2013.01); *G03G 15/0893* (2013.01); *G03G 21/206* (2013.01); *G03G 2215/0822* (2013.01); *G03G 2215/0838* (2013.01); *G03G 2215/088* (2013.01)

(58) Field of Classification Search
CPC ........... G03G 15/0889; G03G 15/0882; G03G 15/0893; G03G 2215/0822; G03G 2215/0838; G03G 2215/088; G03G 2221/1645; G03G 21/206; G03G 15/0881
See application file for complete search history.

(56) References Cited

U.S. PATENT DOCUMENTS

| | | | | | |
|---|---|---|---|---|---|
| 4,615,608 | A * | 10/1986 | Mizutani | G03G 15/0855 222/DIG. 1 |
| 5,012,289 | A * | 4/1991 | Aldrich | G03G 15/0896 222/DIG. 1 |
| 5,030,998 | A * | 7/1991 | Shibata | G03G 15/0882 399/106 |
| 5,221,945 | A * | 6/1993 | Smith | G03G 15/0882 222/DIG. 1 |
| 2014/0270838 | A1* | 9/2014 | Yoshizawa | G03G 15/0893 399/99 |
| 2021/0294244 | A1* | 9/2021 | Oikawa | G03G 15/0942 |
| 2022/0035271 | A1* | 2/2022 | Wakisaka | G03G 15/0891 |

FOREIGN PATENT DOCUMENTS

| | | | |
|---|---|---|---|
| JP | 60120376 | A * | 6/1985 |
| JP | 2006201528 | | 8/2006 |
| JP | 2006250973 | | 9/2006 |

* cited by examiner

*Primary Examiner* — Arlene Heredia
*Assistant Examiner* — Laura Roth
(74) *Attorney, Agent, or Firm* — JCIPRNET

(57) ABSTRACT

A developing device including a holding body, a supply unit, a filling portion, a closing portion, and a duct portion is provided. The holding body holds a developer. The agitating unit agitates the developer. The supply unit supplies the developer that flows in from the agitating unit to the holding body. The filling portion is provided above the agitating unit and filled with the developer. The closing portion closes a lower portion of the filling portion, and causes the developer to drop from the filling portion into the agitating unit in a case where the closing portion is removed. The duct portion connects a space in the filling portion and a portion above the holding body.

17 Claims, 9 Drawing Sheets

DEVELOPING DEVICE AND IMAGE FORMING APPARATUS THAT SUPPRESS DISCHARGE OF DEVELOPER

CROSS-REFERENCE TO RELATED APPLICATIONS

This application is based on and claims priority under 35 USC 119 from Japanese Patent Application No. 2022-048556 filed Mar. 24, 2022.

BACKGROUND

(i) Technical Field

The present invention relates to a developing device and an image forming apparatus.

(ii) Related Art

JP2006-201528A discloses a developing device in which an upper chamber accommodating a new developer communicates with a lower chamber in a case where a seal member attached to a developer drop port provided between the both chambers is peeled off, the new developer drops from the upper chamber to the lower chamber through the drop port, and the upper chamber is provided with a depressurization structure that it is configured to allow depressurization by using a space generated after the seal member is peeled off and the new developer drops into the lower chamber.

JP2006-250973A discloses a developing device that suppresses an increase in an internal pressure of the developing device, facilitates miniaturization and unitization, and is easy to separate from a filter unit that has a problem in maintainability due to clogging of toner or the like.

SUMMARY

Aspects of non-limiting embodiments of the present disclosure relate to a developing device and an image forming apparatus that suppress discharge of a developer from one end of a duct portion as compared with a configuration in which the other end of the duct portion that opens at one end at an upper part of a holding body opens at an upper part of a supply unit.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a developing device including a holding body that holds a developer; an agitating unit that agitates the developer; a supply unit that supplies the developer that flows in from the agitating unit to the holding body; a filling portion provided above the agitating unit and filled with the developer; a closing portion that closes a lower portion of the filling portion, and causes the developer to drop from the filling portion into the agitating unit in a case where the closing portion is removed; and a duct portion that connects a space in the filling portion and a portion above the holding body.

BRIEF DESCRIPTION OF THE DRAWINGS

Exemplary embodiment(s) of the present invention will be described in detail based on the following figures, wherein.

DETAILED DESCRIPTION

An example of a developing device and an image forming apparatus according to an exemplary embodiment will be described with reference to FIGS. 1 to 9. An arrow H shown in each figure indicates a vertical direction and an apparatus vertical direction, an arrow D indicates a horizontal direction and an apparatus depth direction, and an arrow W indicates a horizontal direction and an apparatus width direction.

Overall Configuration of Image Forming Apparatus

Figure 1:
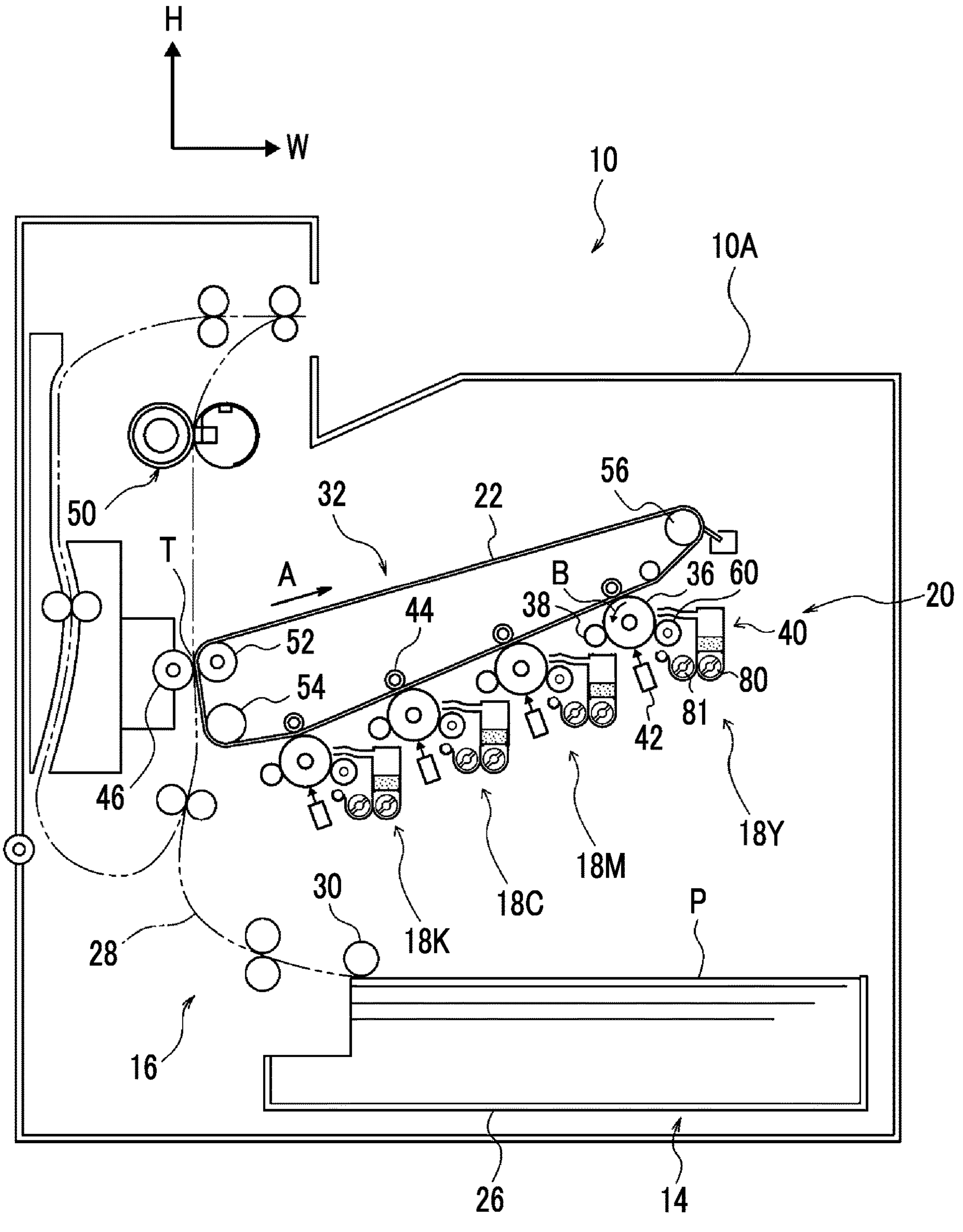
FIG. 1 is a layout diagram showing an overall configuration inside an image forming apparatus according to an exemplary embodiment.

As shown in FIG. 1, an image forming apparatus 10 according to an exemplary embodiment includes an accommodating portion 14 in which a sheet material P as a recording medium is accommodated, a transport unit 16 that transports the sheet material P accommodated in the accommodating portion 14, and an image forming unit 20 that forms an image on the sheet material P transported by the transport unit 16.

Accommodating Portion

The accommodating portion 14 has an accommodating member 26 that can be pulled out from an apparatus main body 10A of the image forming apparatus 10 toward a front side in the apparatus depth direction, and the sheet material P is loaded on the accommodating member 26. Further, the apparatus main body 10A has a delivery roll 30 that delivers the sheet material P loaded on the accommodating member 26 to a transport path 28 configuring the transport unit 16.

Transport Unit

The transport unit 16 has a plurality of transport rolls (reference numerals omitted) for transporting the sheet material P along the transport path 28 to which the sheet material P is transported.

Image Forming Unit

The image forming unit 20 is provided with four image forming units 18Y, 18M, 18C, and 18K of yellow (Y), magenta (M), cyan (C), and black (K). In the following description, in a case where it is not necessary to distinguish Y, M, C, and K, Y, M, C, and K may be omitted. Further, the image forming unit 18 of each color can be attached to and detached from the apparatus main body 10A, respectively.

Further, the image forming unit 18 of each color has a photoreceptor drum 36 that rotates in a direction of an arrow B in the figure, which is an example of an image holding body, and a charging member 38 that charges a surface of the photoreceptor drum 36.

Further, the image forming unit 18 has an exposure device 42 that irradiates the charged photoreceptor drum 36 with exposure light, and a developing device 40 that develops an electrostatic latent image formed by irradiating the photoreceptor drum 36 with exposure light and visualizes the electrostatic latent image as a toner image.

Further, the image forming unit 20 has an endless belt 22 that circumferentially moves in a direction of an arrow A in the figure, an auxiliary roll 52 around which the endless belt 22 is wound, a tension applying roll 54, and a driving roll 56. Further, the image forming unit 20 has a primary transfer roll 44 that transfers the toner image formed by the image forming unit 18 of each color to the endless belt 22.

Further, the image forming unit 20 has a secondary transfer roll 46 that transfers the toner image transferred to the endless belt 22 to the sheet material P. The transfer device 32 includes the endless belt 22, the auxiliary roll 52, the tension applying roll 54, the driving roll 56, and the primary transfer roll 44. Further, the image forming unit 20 has a fixing device 50 for fixing the toner image to the sheet material P by heating and pressurizing the sheet material P to which the toner image is transferred.

Action of Image Forming Apparatus

In the image forming apparatus 10, an image is formed as follows.

First, the charging member 38 of each color to which a voltage is applied uniformly negatively charges the surface of the photoreceptor drum 36 of each color at a predetermined potential. Subsequently, the exposure device 42 irradiates the surface of the photoreceptor drum 36 of each color charged based on image data input from an outside with exposure light to form an electrostatic latent image, thereby forming the electrostatic latent image corresponding to the data on the surface of the photoreceptor drum 36 of each color. Further, the developing device 40 of each color develops the electrostatic latent image and visualizes the electrostatic latent image as a toner image.

Further, the toner images formed on the surface of the photoreceptor drum 36 of each color are sequentially transferred to the endless belt 22 that circumferentially moves by the primary transfer roll 44. On the other hand, the sheet material P delivered from the accommodating member 26 to the transport path 28 by the delivery roll 30 is delivered to a transfer position T where the endless belt 22 and the secondary transfer roll 46 are in contact with each other.

At the transfer position T, the sheet material P is transported between the endless belt 22 and the secondary transfer roll 46, such that the toner image on an outer circumferential surface of the endless belt 22 is transferred to the sheet material P. The toner image transferred to the surface of the sheet material P is fixed to the sheet material P by the fixing device 50. Then, the sheet material P on which the toner image is fixed is discharged to an outside of the apparatus main body 10A.

Configuration of Main Parts

Developing Device

Next, a specific configuration of the developing device 40 of the exemplary embodiment will be described with reference to FIGS. 2 to 9 as appropriate.

Figure 2:
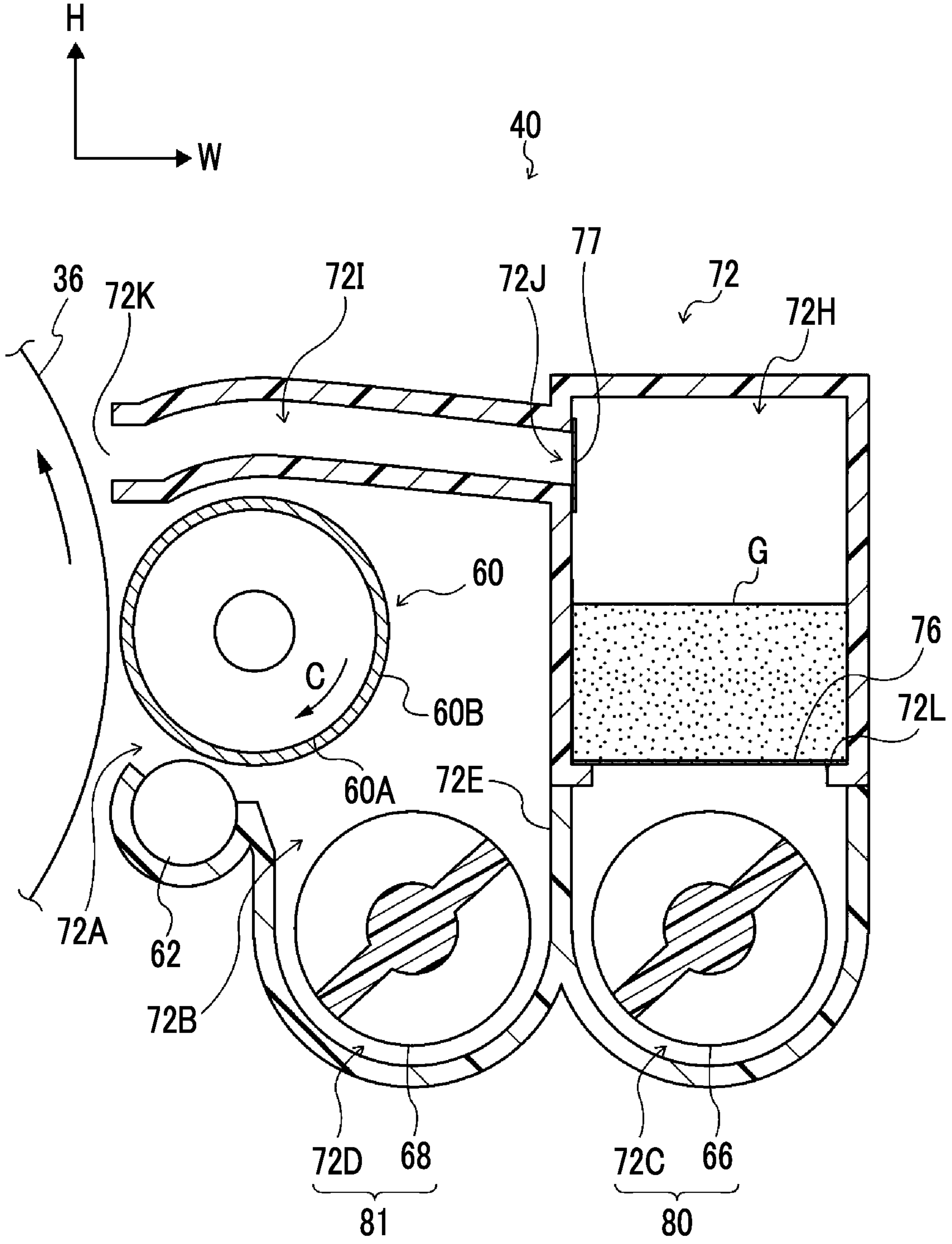
FIG. 2 is a cross-sectional diagram of a developing device according to an exemplary embodiment as viewed from a front side, and is a diagram showing a state before removing a heat seal.

As shown in FIG. 2, the developing device 40 includes a housing 72 including a filling portion 72H filled with a developer G, a duct portion 72I, and the like, a developing roll 60 for holding the developer G, a layer thickness regulating member 62, an agitating unit 80 for agitating the developer G, and a supply unit 81 for supplying the developer G that flows in from the agitating unit 80 to the developing roll 60. The developer G in the present exemplary embodiment is a two-component developer containing toner and a carrier as main components.

The developing roll 60 is disposed so as to face the photoreceptor drum 36, and the electrostatic latent image formed on the surface of the photoreceptor drum 36 is developed by the developer G and visualized as a toner image. A gap (so-called development gap) for passing the developer G from the developing roll 60 to the photoreceptor drum 36 is formed between the developing roll 60 and the photoreceptor drum 36. The developing roll 60 includes a magnet roll 60A having a circular cross section and a rotary sleeve 60B that is placed on the magnet roll 60A and rotates around the magnet roll 60A. The rotary sleeve 60B is adapted to rotate in a direction of an arrow C (clockwise) in the figure by transmitting a rotational force from a drive source (not shown). The developing roll 60 is an example of a holding body.

The layer thickness regulating member 62 regulates a layer thickness of the developer G adhered to the surface of the developing roll 60.

The housing 72 is disposed next to the photoreceptor drum 36, and in the housing 72, an opening 72A for exposing the developing roll 60 is formed to extend in the apparatus depth direction in a portion facing the photoreceptor drum 36.

Further, in the housing 72, a delivery path 72B in which the developing roll 60 is disposed is formed to extend in the apparatus depth direction on an opposite side of the photoreceptor drum 36 with the opening 72A interposed therebetween. Further, in the housing 72, a supply flow path 72D is formed to extend in the apparatus depth direction at a lower part of the delivery path 72B. Further, in the housing 72, an agitating flow path 72C located parallel to the supply flow path 72D is formed to extend in the apparatus depth direction next to the supply flow path 72D.

Further, in the housing 72, between the agitating flow path 72C and the supply flow path 72D, a partition plate 72E that separates the agitating flow path 72C and the supply flow path 72D is formed to rise from an inner surface of a bottom wall of the housing 72.

Figure 4:
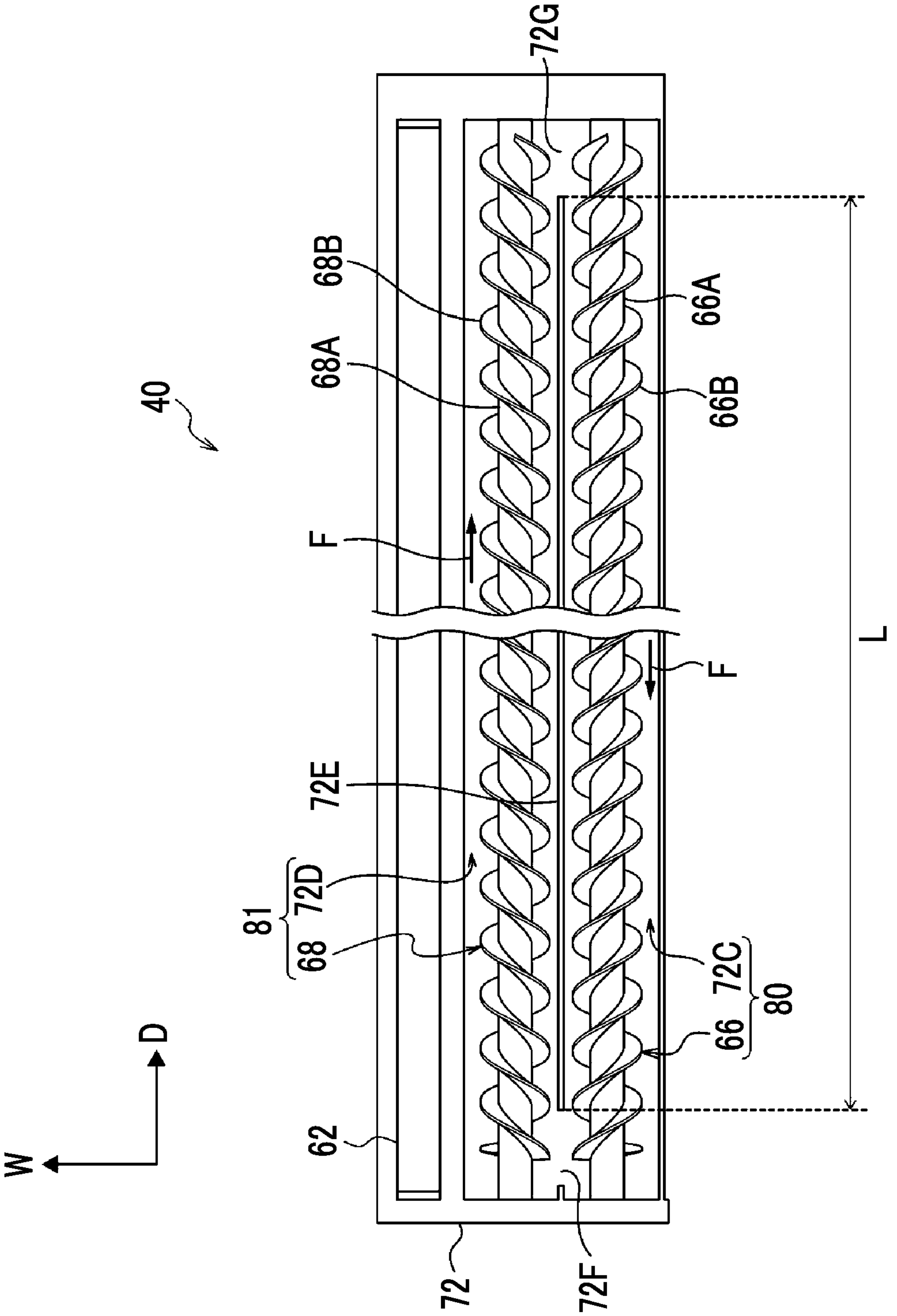
FIG. 4 is a schematic diagram showing a configuration of an agitating unit and a supply unit of a developing device according to an exemplary embodiment.

Further, as shown in FIG. 4, in the housing 72, an agitating auger 66 is disposed in the agitating flow path 72C, and a supply auger 68 is disposed in the supply flow path 72D.

The agitating unit 80 is composed of the agitating auger 66 and the agitating flow path 72C. The agitating auger 66 is an example of an agitating member. Further, the supply unit 81 is composed of the supply auger 68 and the supply flow path 72D.

The agitating auger 66 includes a rotary shaft 66A extending in the apparatus depth direction and a spiral agitating blade 66B formed on an outer circumferential surface of the rotary shaft 66A. The agitating auger 66 rotates with the rotary shaft 66A as an axis to agitate the developer G while transporting the developer G in an axial direction.

The supply auger 68 includes a rotary shaft 68A extending in the apparatus depth direction and a spiral supply blade 68B formed on an outer circumferential surface of the rotary shaft 68A. The supply auger 68 rotates with the rotary shaft 68A as an axis to supply the developer G to the developing roll 60 while transporting the developer G in the axial direction.

Further, in the housing 72, a first connecting port 72F connecting the agitating flow path 72C and the supply flow path 72D is formed adjacent to an end portion on the front side of the partition plate 72E in the apparatus depth direction. Further, in the housing 72, a second connecting port 72G connecting the agitating flow path 72C and the supply flow path 72D is formed adjacent to an end portion on an inner side of the partition plate 72E in the apparatus depth direction. As a result, a circulation path through which the developer G circulates is formed by the agitating flow path 72C, the supply flow path 72D, the first connecting port 72F, and the second connecting port 72G.

In the present exemplary embodiment, by transmitting a rotational force from a drive source (not shown) to the agitating auger 66 and the supply auger 68 and rotating the agitating auger 66 and the supply auger 68, the developer G is configured to circulate in a direction indicated by an arrow F in FIG. 4.

Figure 5:
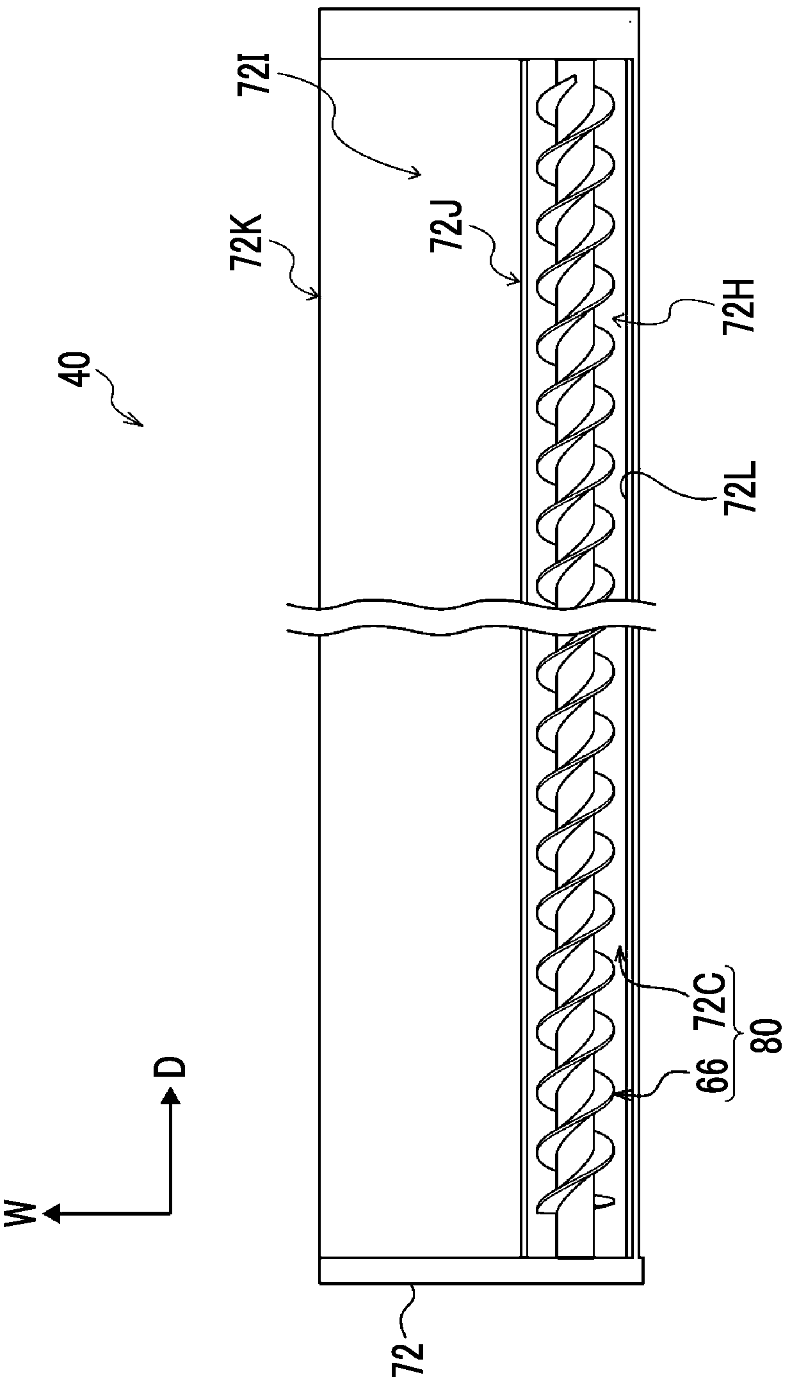
FIG. 5 is a schematic diagram showing a configuration of an agitating unit, a filling portion, and a duct portion of a developing device according to an exemplary embodiment.

Further, as shown in FIG. 5, in the housing 72, the filling portion 72H is disposed at least over an entire range of the agitating flow path 72C in the apparatus depth direction. The agitating flow path 72C is a range partitioned by the partition plate 72E as shown by an arrow L in FIG. 4. A length of the filling portion 72H in the apparatus depth direction is configured to be equal to or greater than a length L of the agitating flow path 72C in the apparatus depth direction.

Further, in the housing 72, the duct portion 72I connecting a space inside the filling portion 72H and an upper part of the developing roll 60 is formed to extend in the apparatus depth direction on a side surface of the filling portion 72H. The duct portion 72I connects the space inside the filling portion 72H and the upper part of the developing roll 60 within a range including an entire range of the agitating flow path 72C in the apparatus depth direction. That is, the length of the duct portion 72I in the apparatus depth direction is configured to be equal to or greater than the length L of the agitating flow path 72C in the apparatus depth direction.

Further, the developing device 40 has the heat seal 76 that closes a lower portion of the filling portion 72H and a heat seal 77 that blocks a flow of air from the filling portion 72H to an opening 72K of the duct portion 72I, before the start of use such as after shipment and before installation at a place of use (for example, during transportation). The heat seal 76 is an example of a closing portion and a first seal-shaped member. Further, the heat seal 77 is an example of a blocking portion and a second seal-shaped member.

Figure 3:
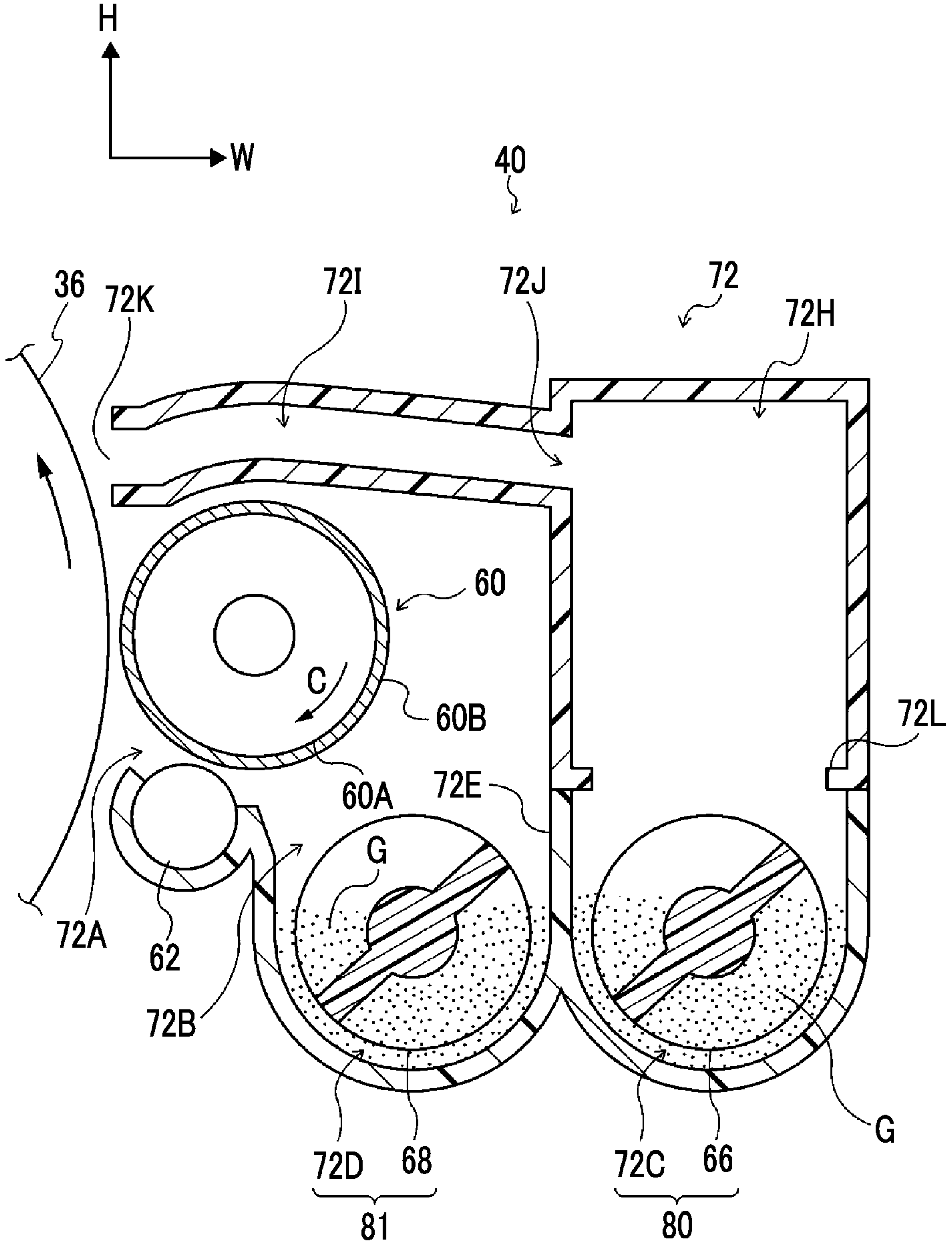
FIG. 3 is a cross-sectional diagram of a developing device according to an exemplary embodiment as viewed from a front side, and is a diagram showing a state after removing a heat seal.

As shown in FIG. 2, in the developing device 40, the filling portion 72H is filled with the developer G in a state before the heat seal 76 and the heat seal 77 are removed. Further, as shown in FIG. 3, in the developing device 40, the heat seal 76 and the heat seal 77 are removed during use. As a result, the developer G stored in the filling portion 72H drops into the agitating unit 80 and is supplied to the developing roll 60 via the supply unit 81. Further, air flows from the filling portion 72H to the opening 72K of the duct portion 72I.

Figure 6:
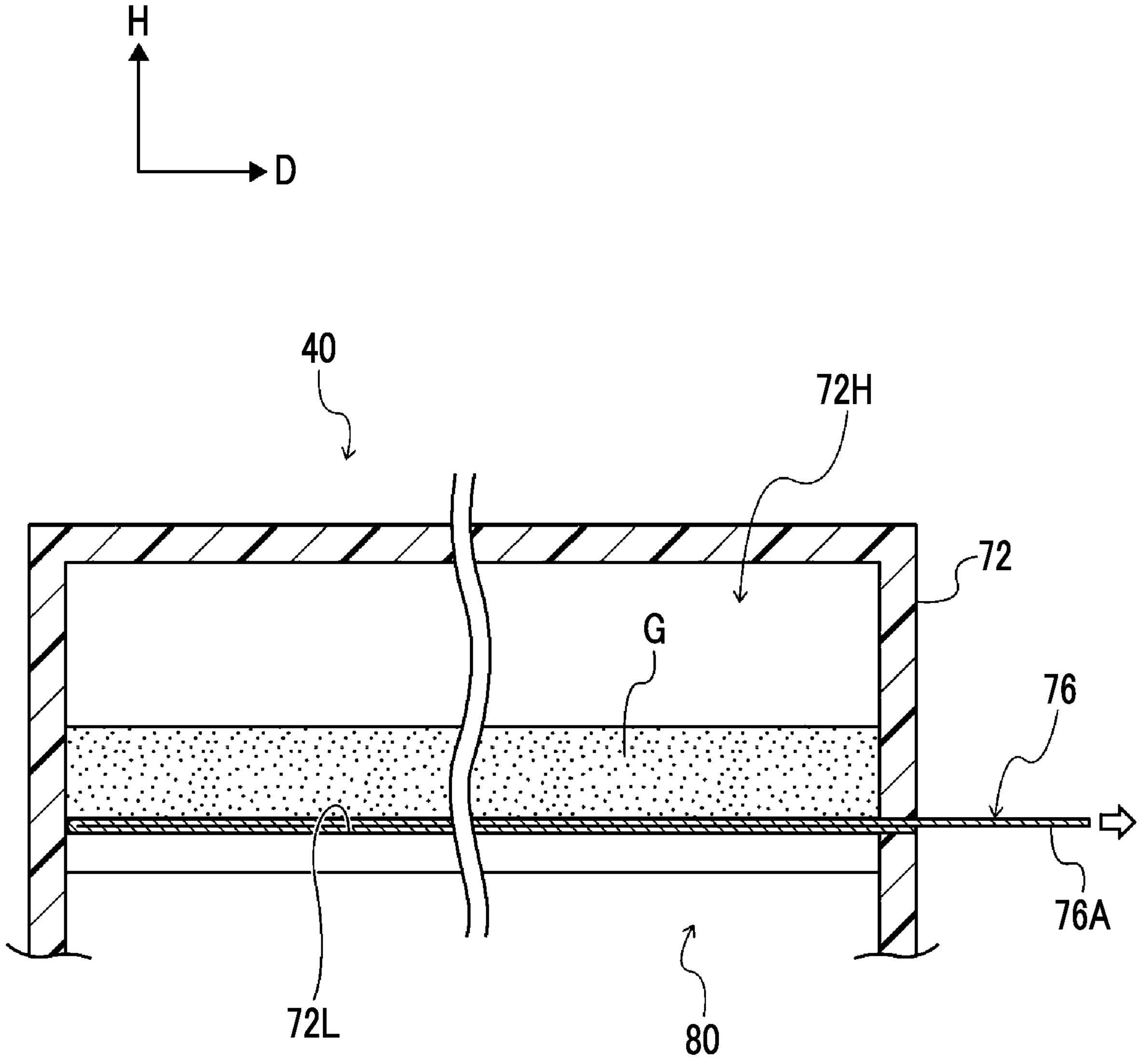
FIG. 6 is a schematic diagram showing a configuration of an agitating unit, a filling portion, and a heat seal of a developing device according to an exemplary embodiment.

As shown in FIG. 6, the heat seal 76 is a film made of polyethylene as an example, which is provided between the filling portion 72H filled with the developer G and the agitating unit 80. The heat seal 76 is configured to prevent the developer G from leaking from the filling portion 72H to the agitating unit 80 during transportation by closing a space between the filling portion 72H and the agitating unit 80.

The heat seal 76 is heat-welded to, for example, a welded portion 72L of the heat seal having a rectangular frame shape formed in the housing 72 in a double-folded state. An end portion 76A of the heat seal 76 folded over the welded portion 72L protrudes from the end portion on the front side of the housing 72. In a case where the end portion 76A protruding from the end portion on the front side of the housing 72 is pulled, the heat seal 76 is pulled out to the outside of the housing 72 while being peeled off from the welded portion 72L. In a case where the heat seal 76 is removed from the housing 72, the developer G drops from the filling portion 72H into the agitating unit 80.

Figure 7:
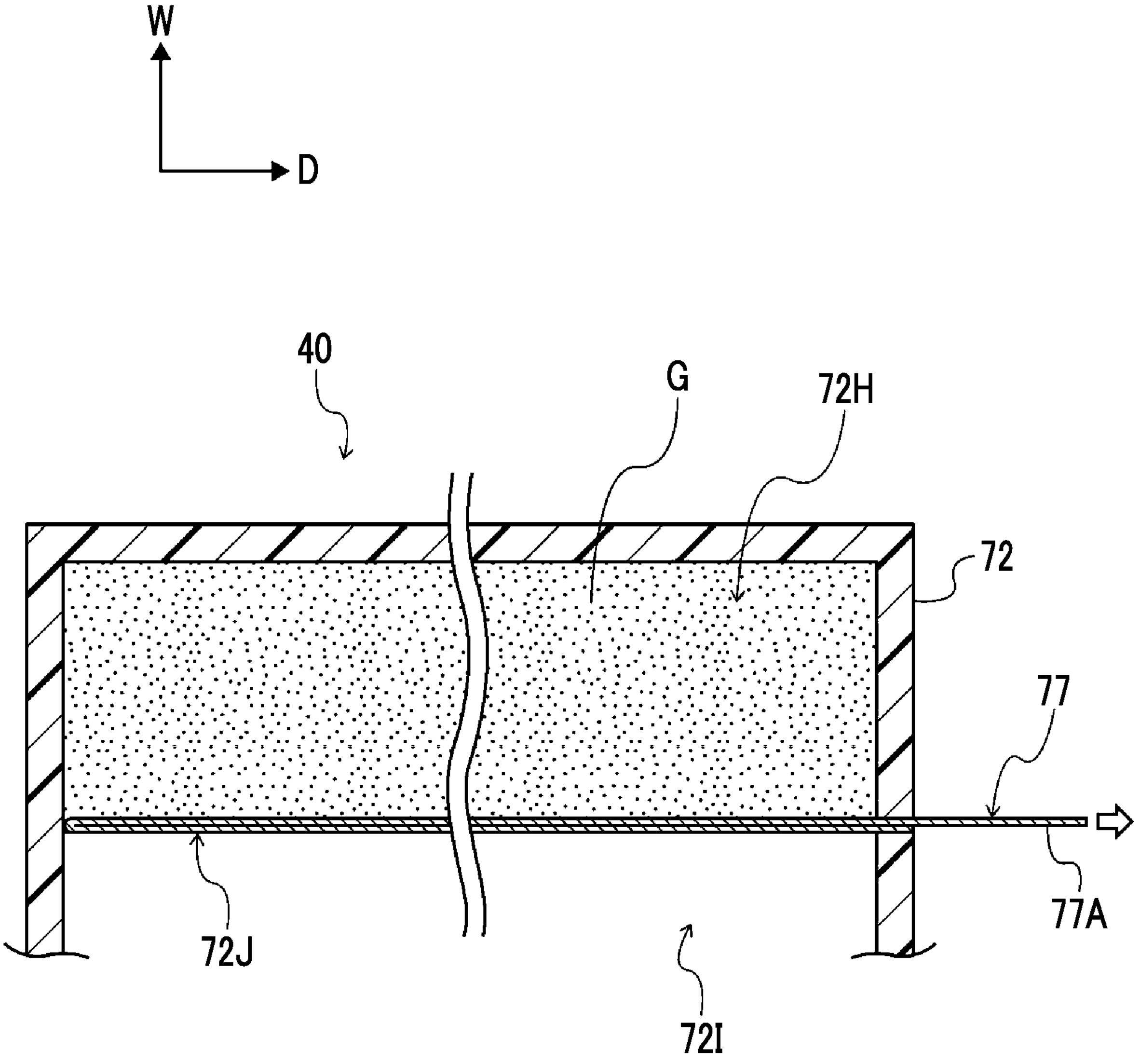
FIG. 7 is a schematic diagram showing a configuration of a filling portion, a duct portion, and a heat seal of a developing device according to an exemplary embodiment.

As shown in FIG. 7, the heat seal 77 is a film made of polyethylene as an example, which is provided between the filling portion 72H filled with the developer G and the duct portion 72I. The heat seal 77 is configured to prevent the developer G from leaking from the filling portion 72H to the duct portion 72I during transportation by closing a space between the filling portion 72H and the duct portion 72I.

For example, the heat seal 77 is heat-welded to a peripheral surface of an opening 72J between the filling portion 72H and the duct portion 72I in a double-folded state on the inner surface of the filling portion 72H. An end portion 77A of the heat seal 77 folded over the welded portion protrudes from the end portion on the front side of the housing 72. In a case where the end portion 77A protruding from the end portion on the front side of the housing 72 is pulled, the heat seal 77 is pulled out to the outside of the housing 72 while being peeled off from the welded portion. In a case where the heat seal 77 is removed from the housing 72, air flows from the filling portion 72H to the duct portion 72I.

Figure 8:
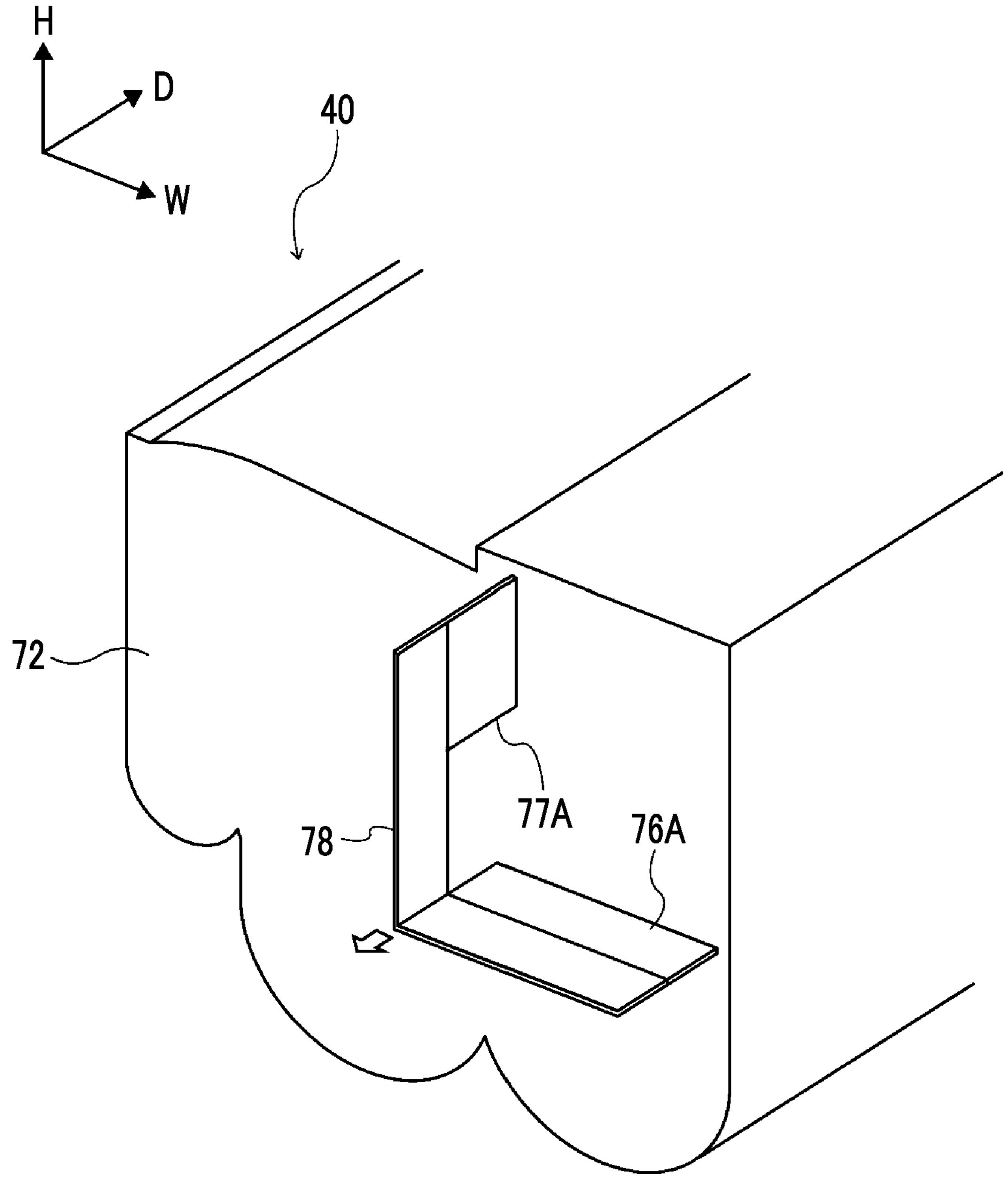
FIG. 8 is a schematic diagram showing a connecting member for connecting two heat seals of a developing device according to an exemplary embodiment.

Further, as shown in FIG. 8, the end portion 76A of the heat seal 76 and the end portion 77A of the heat seal 77 are connected to each other by a connecting member 78 on the outside of the housing 72 so as to be removable in one operation.

The developing device 40 described above can be attached to and detached from the apparatus main body 10A. For example, in a case where the toner in the developer G is consumed, the developing device 40 is replaced with a new one.

Action of Developing Device

In the developing device 40, the development of the photoreceptor drum 36 is performed as follows. First, in a case where the developing device 40 is used, the heat seal 76 and the heat seal 77 are removed. As a result, the developer G stored in the filling portion 72H drops into the agitating unit 80, and then circulates in the circulation path consisting of the agitating flow path 72C of the agitating unit 80, the supply flow path 72D of the supply unit 81, the first connecting port 72F, and the second connecting port 72G. Further, air that flows in the inside of the housing 72 in accordance with the rotation of the developing roll 60 flows from the filling portion 72H to the opening 72K of the duct portion 72I via the delivery path 72B, the supply flow path 72D, the first connecting port 72F and the second connecting port 72G, and the agitating flow path 72C.

The developer G is supplied to the developing roll 60 from the supply unit 81 in the delivery path 72B. The developing roll 60 is disposed so as to face the photoreceptor drum 36, and the electrostatic latent image formed on the surface of the photoreceptor drum 36 is developed by the developer G and visualized as a toner image.

During the development of the photoreceptor drum 36, in the developing device 40, air is drawn into the housing 72 by the rotation of the developing roll 60, and a pressure inside the housing 72 increases. Therefore, the housing 72 is configured to release the pressure inside the housing 72 from the opening 72K of the duct portion 72I.

Further, during the development of the photoreceptor drum 36, the developer G that drops from the developing roll 60 and is returned to the supply flow path 72D collides with the developer G transported in the supply flow path 72D, toner contained in the developer G is diffused, and a so-called toner cloud is generated. In a comparative example provided with the duct portion connecting the upper part of the supply unit 81 and the opening 72K, the toner cloud partially adheres to an inner surface of the duct portion in a case where the pressure inside the housing 72 is released, but easily leaks to the outside of the housing 72 from the opening 72K of the duct portion.

Figure 9:
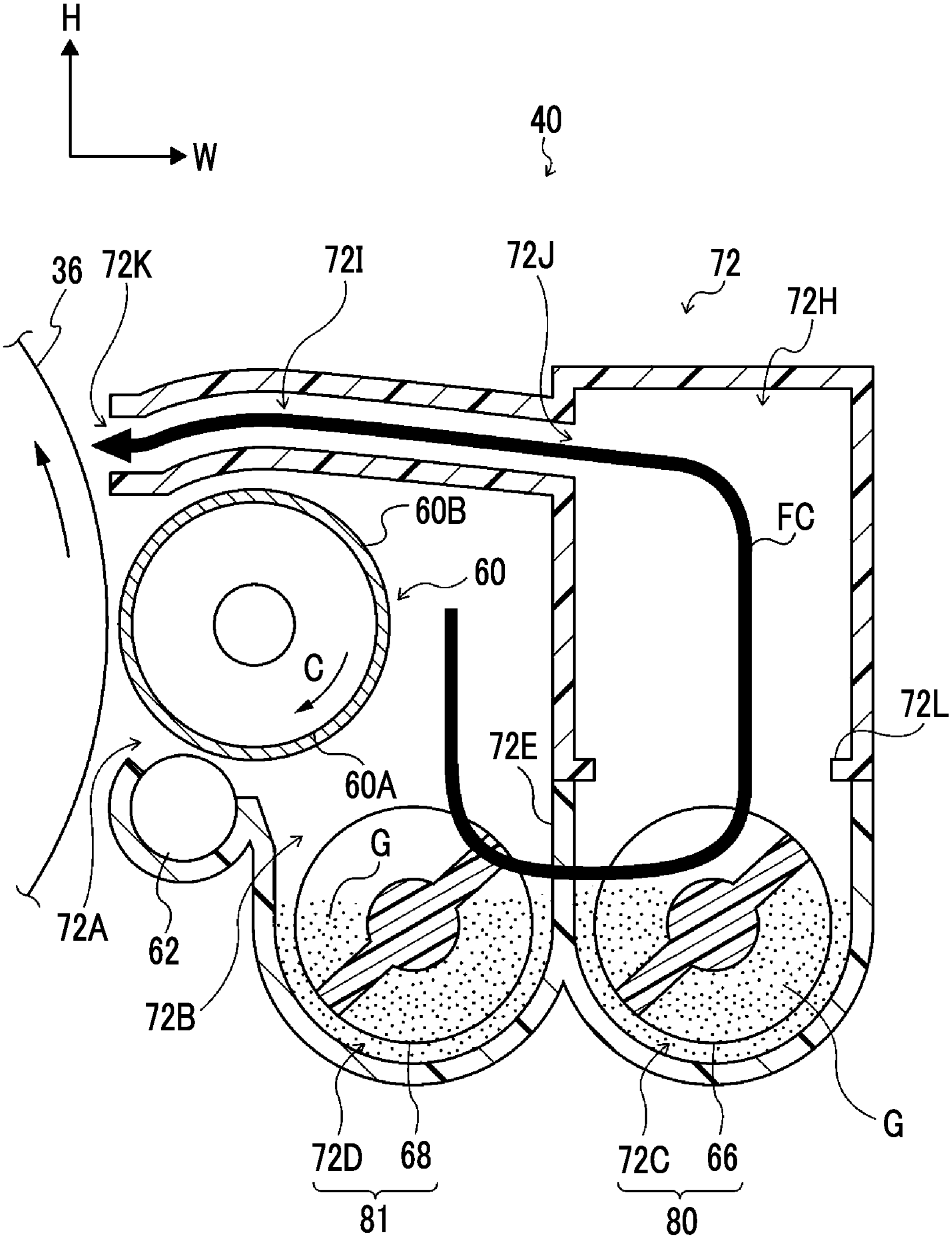
FIG. 9 is a schematic diagram showing an air flow inside a housing of a developing device according to an exemplary embodiment.

In the developing device 40 of the present exemplary embodiment, since the housing 72 is configured as described above, in a case where the pressure inside the housing 72 is released, as shown by an arrow FC in FIG. 9, air in the delivery path 72B including the toner cloud passes through the supply flow path 72D of the supply unit 81, the first connecting port 72F and the second connecting port 72G, the agitating flow path 72C of the agitating unit 80, the filling portion 72H, and the duct portion 72I in order, and is discharged from the opening 72K.

Here, in the developing device 40 of the present exemplary embodiment, since the duct portion 72I connects the filling portion 72H and the opening 72K to each other, the inner surface of the duct portion is wider than the inner surface of the above comparative example.

Further, in the developing device 40 of the present exemplary embodiment, the filling portion 72H drops the developer G only into the agitating flow path 72C. That is, the air that flows in the inside of the housing 72 with the rotation of the developing roll 60 is discharged to the outside from the duct portion 72I via the agitating flow path 72C and the filling portion 72H, and the flow path length until the discharge is long.

Further, in the developing device 40 of the present exemplary embodiment, the filling portion 72H is disposed at least over the entire range of the agitating flow path 72C in the apparatus depth direction.

Further, in the developing device 40 of the present exemplary embodiment, the duct portion 72I connects the space inside the filling portion 72H and the upper part of the developing roll 60 within a range including an entire range of the agitating flow path 72C in the apparatus depth direction.

Further, the developing device 40 of the present exemplary embodiment is provided with the heat seal 77 that blocks the flow of air from the filling portion 72H to the opening 72K of the duct portion 72I, before the start of use such as after shipment and before installation at a place of use (for example, during transportation).

Further, in the developing device 40 of the present exemplary embodiment, the heat seal 77 which is a blocking portion has the same structure as the heat seal 76 which is a closing portion.

Further, in the developing device 40 of the present exemplary embodiment, the heat seal 76 which is a closing portion and the heat seal 77 which is a blocking portion are connected by the connecting member 78 so as to be removable in one operation.

Modification

The configuration of the developing device 40 according to the present disclosure is not limited to the above description.

For example, in the above description, although the filling portion 72H is disposed such that the developer G drops only into the agitating unit 80 in a case where the heat seal 76 is removed, the filling portion 72H may be disposed so that the developer G drops into the agitating unit 80 and the supply unit 81.

Further, in the above description, the agitating unit 80 is composed of the agitating auger 66 and the agitating flow path 72C, but the configuration of the agitating unit 80 is not limited to the above. Similarly, the supply unit 81 is composed of the supply auger 68 and the supply flow path 72D, but the configuration of the supply unit 81 is not limited to the above.

Further, in the above description, although the duct portion 72I has an aspect in which the space inside the filling portion 72H and the upper part of the developing roll 60 are connected in a range including the entire range of the agitating flow path 72C in the apparatus depth direction, the configuration of the duct portion 72I is not limited to the above.

Further, in the above description, although the developing device 40 is provided with the heat seal 77 at the time of transportation, the present invention is not limited to this. For example, instead of the above-described configuration, a configuration that does not have the heat seal 77 may be used.

Further, in the above description, the heat seal 76 is provided as the closing portion and the heat seal 77 is provided as the blocking portion, but the configuration of the closing portion and the blocking portion is not limited to the above, and may be another aspect.

Further, in the above description, although the end portion 76A of the heat seal 76 and the end portion 77A of the heat seal 77 are connected by the connecting member 78 on the outside of the housing 72, both may be individually removed.

Although the exemplary embodiments of the present disclosure have been described above with reference to the accompanying drawings, it is clear that anyone with ordinary knowledge in the field of the art to which this disclosure belongs can come up with various modifications or applications within the scope of the technical ideas described in the claims, and it is understood that these also naturally belong to the technical scope of the present disclosure.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A developing device comprising:
a holding body that holds a developer;
an agitating unit that agitates the developer;
a supply unit that supplies the developer that flows in from the agitating unit to the holding body;
a filling portion provided above the agitating unit and filled with the developer;
a closing portion that closes a lower portion of the filling portion, and causes the developer to drop from the filling portion into the agitating unit in a case where the closing portion is removed;
a duct portion that connects a space in the filling portion and a portion above the holding body, wherein a space inside the duct portion is divided vertically from a space inside the developing device where the holding body resides; and
a blocking portion that blocks a flow of air between the filling portion and the duct portion, and allows air to flow from the filling portion to the duct portion in a case where the blocking portion is removed.

2. The developing device according to claim 1,
wherein the filling portion is disposed such that the developer drops only into the agitating unit in a case where the closing portion is removed.

3. The developing device according to claim 2,
wherein the agitating unit has an agitating flow path formed in a housing to extend in one direction, and an agitating member provided in the agitating flow path and rotating around an axis of the agitating member to agitate the developer while transporting the developer in a direction of the axis of the agitating member, and
the filling portion is disposed at least over an entire range of the agitating flow path in the one direction.

4. The developing device according to claim 3,
wherein the duct portion connects the space in the filling portion and the portion above the holding body in a range including the entire range of the agitating flow path in the one direction.

5. The developing device according to claim 4,
wherein the closing portion is a first seal-shaped member that closes a downward opening of the filling portion and is removed by being pulled out, and
the blocking portion is a second seal-shaped member that closes an opening at a boundary between the filling portion and the duct portion and is removed by being pulled out.

6. The developing device according to claim 5,
wherein the first seal-shaped member and the second seal-shaped member are connected to each other to be removable in one operation.

7. An image forming apparatus comprising:
an image holding body that holds a latent image;
the developing device according to claim 4, that develops the latent image to form a toner image; and
a transfer device that transfers the toner image to a medium.

8. The developing device according to claim 3,
wherein the closing portion is a first seal-shaped member that closes a downward opening of the filling portion and is removed by being pulled out, and
the blocking portion is a second seal-shaped member that closes an opening at a boundary between the filling portion and the duct portion and is removed by being pulled out.

9. The developing device according to claim 8,
wherein the first seal-shaped member and the second seal-shaped member are connected to each other to be removable in one operation.

10. An image forming apparatus comprising:
an image holding body that holds a latent image;
the developing device according to claim 3, that develops the latent image to form a toner image; and
a transfer device that transfers the toner image to a medium.

11. The developing device according to claim 2,
wherein the closing portion is a first seal-shaped member that closes a downward opening of the filling portion and is removed by being pulled out, and
the blocking portion is a second seal-shaped member that closes an opening at a boundary between the filling portion and the duct portion and removed by being pulled out.

12. The developing device according to claim 11,
wherein the first seal-shaped member and the second seal-shaped member are connected to each other to be removable in one operation.

13. An image forming apparatus comprising:
an image holding body that holds a latent image;
the developing device according to claim 2, that develops the latent image to form a toner image; and
a transfer device that transfers the toner image to a medium.

14. The developing device according to claim 1,
wherein the closing portion is a first seal-shaped member that closes a downward opening of the filling portion and is removed by being pulled out, and
the blocking portion is a second seal-shaped member that closes an opening at a boundary between the filling portion and the duct portion and is removed by being pulled out.

15. The developing device according to claim 14,
wherein the first seal-shaped member and the second seal-shaped member are connected to each other to be removable in one operation.

16. An image forming apparatus comprising:
an image holding body that holds a latent image;
the developing device according to claim 1, that develops the latent image to form a toner image; and
a transfer device that transfers the toner image to a medium.

17. The developing device according to claim 1, wherein the closing portion closes a downward opening of the filling portion, and wherein the blocking portion closes an opening at a boundary between the filling portion and the duct portion.

* * * * *